United States Patent [19]

Mtangi et al.

[11] Patent Number: 4,647,324

[45] Date of Patent: Mar. 3, 1987

[54] PROCESS FOR PRE-RESINATING CELLULOSE FIBERS FOR CELLULOSE COMPOSITE STRUCTURES

[75] Inventors: Stanlake A. Mtangi, West Paterson; David H. Fishman, Berkeley Heights, both of N.J.

[73] Assignee: United Technologies Automotive Trim, Inc., Dearborn, Mich.

[21] Appl. No.: 737,834

[22] Filed: May 24, 1985

[51] Int. Cl.[4] .......................... B32B 23/02; B32B 31/24

[52] U.S. Cl. .................................. 156/62.2; 156/62.4; 156/242; 156/283; 264/121; 428/288; 428/290

[58] Field of Search ...................... 156/62.2, 62.4, 242, 156/245, 283; 264/109, 118, 121, 122; 428/288, 290

[56] References Cited

U.S. PATENT DOCUMENTS

| | | | |
|---|---|---|---|
| 3,718,536 | 2/1973 | Downs et al. | 156/62.2 |
| 3,741,863 | 6/1973 | Brooks | 162/4 |
| 4,230,585 | 10/1980 | Bird et al. | 252/8.1 |
| 4,302,488 | 11/1981 | Lowi, Jr. | 427/212 |
| 4,379,194 | 4/1983 | Clarke et al. | 428/203 |
| 4,404,250 | 9/1983 | Clarke | 156/62.4 |
| 4,418,031 | 11/1983 | Doerer et al. | 264/241 |
| 4,439,477 | 3/1984 | Kiss | 428/102 |

*Primary Examiner*—Caleb Weston

*Attorney, Agent, or Firm*—Alan C. Cohen; E. Richard Skula

[57] ABSTRACT

An improved method of molding articles from air-laid webs wherein resin is deposited in a dry process onto cellulose fibers prior to air-laying. Cellulose material and a resin-containing airstream are simultaneously fed into a comminuting means such as a hammer mill. The cellulose particles thereby produced have a coating which adheres to the surface of the cellulose particles. The cellulose particles retain substantially all of the dry resin coating when pneumatically conveyed and air-laid into a web. The fiber web produced with the resin-coated particles is suitable for use in a conventional molding process whereby the web is molded under sufficient heat and pressure into a molded article having a uniform resin distribution resulting in improved strength and improved structural integrity.

10 Claims, 1 Drawing Figure

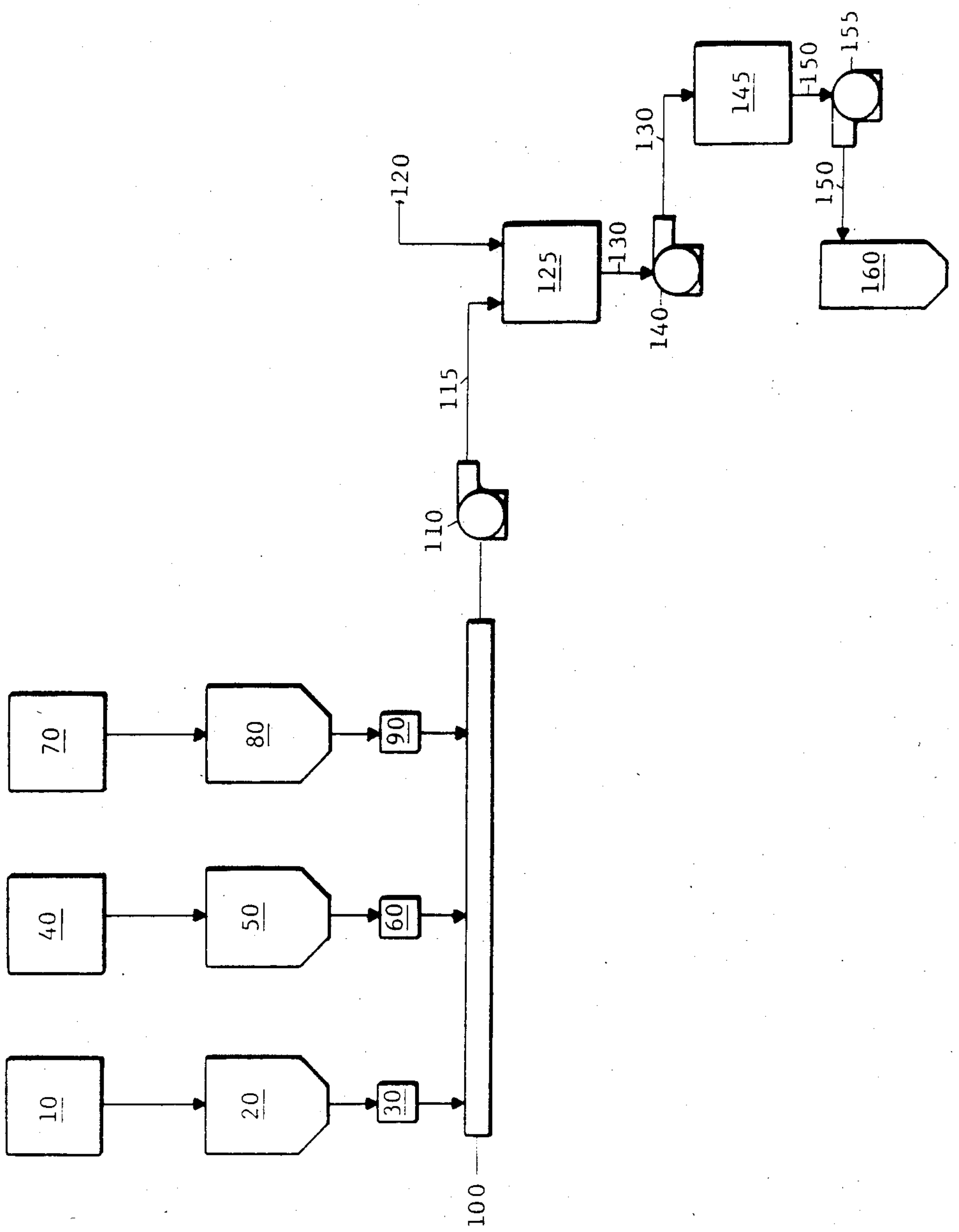
10
20
30
40
50
60
70
80
90
100
110
115
120
125
130
140
145
150
155
160

PROCESS FOR PRE-RESINATING CELLULOSE FIBERS FOR CELLULOSE COMPOSITE STRUCTURES

DESCRIPTION

1. Technical Field

The field of art to which this invention pertains is resin-containing composite materials and methods of making the same.

2. Background Art

Nonwoven fiber fabrics, fiber webs or fiber mats and the methods of manufacturing these products are well known in the art. Typically, fibers are entrained in an airstream, and the airstream is directed to an endless belt having perforations or an endless belt comprising screen or mesh-type material. A vacuum is typically applied to the underside of the belt while the fiber-containing airstream is directed to the topside of the belt, thereby producing a fiber mat or web which is then removed from the endless belt and rolled up for further processing.

Although many types of fibers can be used to form the nonwoven webs, depending upon the application, cellulose fibers and blends of cellulose fibers and synthetic fibers are typically used. Cellulose fibers are readily available, inexpensive and easy to work with. Cellulose fibers can be easily blended with synthetic fibers such as thermoplastic, glass fiber, etc. The synthetic fibers are typically longer than the cellulose fibers and tend to mesh together easily with each other and the cellulose fibers into an interconnecting lattice to form a web. The non-woven fiber webs, mats, cloths, etc. produced by such a process have multiple uses such as insulating material, woven cloth substitutes, filling materials, etc.

It is also known in the art to produce nonwoven fiber webs containing thermoplastic or thermosetting resins, or combinations thereof, which are then further processed by molding in conventional molding machines into objects having various shapes. It is necessary to incorporate a resinous binder component into the fiber mat at some point in the processing. There have been two approaches to incorporating the resin. The first approach is a "wet" approach wherein the resin is dissolved in a solvent such as water and sprayed onto the fibers or particles. The other approach is a "dry" approach wherein the resin is blended with the fibers prior to forming the mat, or the dry resin is incorporated after the mat is formed.

U.S. Pat. No. 4,439,477 discloses a fiber mat formed from fibers wetted with a small amount of binder. The mat is formed by loosely sprinkling the fibers onto an endless belt. The fiber mat is designed to be molded into a three dimensional product.

U.S. Pat. No. 4,418,031 discloses a moldable non-woven fibrous mat useful for molding into articles. The mat is formed by a dry process and incorporates thermoplastic fibers and thermosetting resin dispersed throughout the mat.

U.S. Pat. No. 3,718,536 discloses a structure formed from an air laid web wherein the web is formed from wood chips or wood particles tumbled with a thermosetting resin binder.

U.S. Pat. No. 4,379,194 discloses air laid thermosetting resin-containing mats molded into high pressure laminates wherein cellulose and resin are simultaneously fed into a hammer mill to produce a fiber and resin stream which is air laid.

There are several problems associated with the wet approach. First of all, the solvent must typically be removed from the fibers prior to entraining the fibers in the airstream in order to produce an acceptable fiber mat. Secondly, wet fibers tend to agglomerate and are difficult to process. In addition, removal of the solvent typically results in the removal of part of the resin.

Although the dry process eliminates the need for solvent removal, and there is no particle agglomeration problem, it has been observed that the dry powdered resin tends to separate from the fiber web during the airlaying process. To compensate for this phenomenon, it is necessary to use an excess of resin to achieve the desired resin content in the finished fiber web. However, it is extremely difficult to get a uniform distribution of resin in the web. It is also difficult to obtain a uniform distribution of resin in a fiber web when the resin is incorporated after web formation, for example, by utilizing a spreader mechanism. The separated resin which results from a dry process must either be recycled or disposed of.

In either the wet or dry process, the distribution of resin in an air-laid web tends to be nonuniform. An article molded from such a web tends to have deficient mechanical properties such as tensile strenth, flexural strength, and impact strength.

Accordingly, what is needed in this art is a method of forming moldable resin-containing composite mats which overcome the problems of the prior art.

DISCLOSURE OF INVENTION

An improved method of molding objects from a resin-containing cellulose particle web is disclosed. The mat is made by an air-laying process. The improvement comprises producing dry resin-coated cellulose particles by simultaneously feeding cellulose material and a dry resin-containing air stream into a comminuting means and retaining the resin and cellulose resin in the comminuting means for a sufficient period of time so that the resin is uniformly deposited over the surface of the cellulose particles such that substantially all of the resin adheres to the particles during subsequent pneumatic conveying and air-laying into a fiber web. The web is then molded at sufficient temperature and pressure, thereby producing a molded article having a uniform distribution of resin, wherein the molded article has high strength and structural integrity.

Another aspect of this invention is a molded article produced by the above-mentioned method.

The foregoing, and other features and advantages of the present invention, will become more apparent from the following description and accompanying drawing.

BRIEF DESCRIPTION OF THE DRAWINGS

The FIGURE is a flow diagram of a typical process for manufacturing the dry resin coated cellulose particles of the present invention.

BEST MODE FOR CARRYING OUT THE INVENTION

The term "cellulose particles" as used herein is defined to mean cellulose fibers, particles, dust, chips, shreds or equivalents thereof or combinations thereof produced by processing wood, wood products, bagasse, paper, straw, ricehulls, cotton, vegetable stems, seeds, cork or any similar cellulose materials, either alone or in a mixture with one or more cellulosic materials, through conventional comminuting equipment, such as a chopper, shredder, hammer mill, etc., wherein the cellulose particles are of sufficient size to permit forming into an air-laid web. In order to facilitate the formation of a web, the cellulose particles of this invention will preferably take the form of fibers.

The cellulose particles of this invention will typically comprise milled cellulosic material which has been comminuted through a comminuting means such as a hammermill set up at about one-eighth inch (3.18 mm). The cellulose material will typically comprise paper such as news- print, wastepaper of any type, or paper such as kraft paper or bond paper, etc. The cellulose particles will typically range in average size from less than about one sixty-fourth inch (0.40 mm) to about one inch (25.4 mm) in length. Preferably, the cellulose particles will comprise paper which has been processed through a one-eighth inch (3.18 mm) hammer mill having an average particle size of about 1/16" (1.59 mm) to about ¼" (6.35 mm) in length.

Synthetic fibers are used in the molded articles of the present invention to produce resiliency and structural integrity and to facilitate web formation by forming an interconnecting lattice.

The synthetic fibers may comprise any synthetic material capable of bonding to the cellulose particles and the resin. The synthetic fibers typically comprise thermoplastic material in order to bond to the cellulose particles and phenolic resin during the molding step of the trim panel manufacturing process, however fibers comprising non-thermoplastic materials may be used, such as glass fiber. The thermal characteristics of the synthetic fibers should preferably be such that the synthetic fibers can survive the trim panel molding process without decomposition, but some degree of softening or even melting can optionally occur to facilitate the aforementioned bonding of the fibers to the cellulose particles and the thermosetting resin.

Typically, the synthetic fibers used in the practice of this invention will be polyester, glass fiber, polypropylene or a combination thereof. A preferred embodiment comprises polyester fibers.

The synthetic fiber length should be adequate to form an air-laid web with the cellulose particles, thereby forming an interconnected lattice in the web and the subsequently molded trim panel, and providing structural integrity and resiliency. Fibers which are too long will bind up the air-laid web forming equipment. Fibers which are too short will not be capable of forming the interconnected lattice necessary to produce an air-laid web. Typically, synthetic fiber length will range from about 1/16" (1.6 mm) to about 4.0" (101.6 mm). More typically the fiber length will range from about ¼" (6.35 mm) to about 2" (50.1 mm). Preferably, fiber length will be about 1½" (38.1 m).

The synthetic fiber denier will be such that the fibers will be easily formed into an air-laid web. Denier is defined as linear density of the fiber measured in grams/9000 meters. Although fiber deniers in the range of about 1.0 to about 15.0 can be used in the practice of this invention, more typically the denier will range from about 3.0 to about 9.0. A preferred embodiment uses synthetic fiber having about a 6.0 denier.

The resins which can be used in the practice of this invention include the thermosetting resins and the thermoplastic resins. The thermosetting resins are easily processed and have excellent binding characteristics. A typical thermosetting resin has a quick cure time and enhances the structural integrity of the molded object. The thermosetting resin typically bonds easily with the cellulose particles used in the practice of this invention as well any other particles, synthetic fibers, adhesive, etc., in the fiber web. The thermosetting resins of this invention are typically used in dry, powdered form. Typically, the thermosetting resins of this invention will comprise commercially available thermosetting resins such as phenol-formaldehyde, urea-formaldehyde, or melamine formaldehyde thermosetting resins. Additional resins which can be used are commercially available thermosetting epoxy resins, thermosetting polyester resins, thermosetting alkyd resins, etc. Preferably, phenol-formaldehyde resins are used to manufacture the cellulose particles of this invention. Examples of commercially available resins which can be used to form the cellulose particles of this invention include Durez TM 31840 brand thermosetting resin manufactured by Durez Resin and Molding Co., Tonawanda, N.Y., and Resinoy TM RS7441 brand thermosetting resin manufactured by Monsanto Co., St. Louis, Mo.

Thermoplastic resins can also be used to in the practice of this invention if one were willing to accept the disadvantages atttendant with their use. For example, a thermoplastic resin which can be used is polyamide resin. The thermoplastic resins will be similarly used in dry, powdered form and will bond readily to the synthetic fibers and cellulose particles.

The particle size of the dry resins used will typically be about 1 micron to about 5 microns, and preferably about 2 microns to about 4 microns.

Flame retardants are optionally included in the molded articles of this invention to reduce or eliminate any tendency to ignite. A typical flame retardant is boric acid. Boric acid is a commercially available substance used as a flame retardant in cellulosic insulation, mattress batting, and cotton textile products. It is typically used, in the practice of this invention, in powder form. An example of commercially available boric acid is Firebrake ZB TM brand Borax manufactured by U. S. Borax and Chemical Corp., Los Angeles, Calif.

Barium sulfate is also a substance which can be used as a flame retardant. It is also used in the practice of this invention in powder form. Barium sulfate is commercially available from various sources such as U. S. Borax and Chemical Corp., Los Angeles, Calif. Boric acid and barium sulfate are preferred flame retardants for use in the practice of the present invention.

The FIGURE is a flow diagram showing a typical process according to this invention. Referring to the FIGURE, the process is initiated by charging resin 10 into hopper 20. Boric acid 40 is optionally charged into hopper 50 and barium sulfate 70 is optionally charged into hopper 80. Resin 10 flows from hopper 20 into milling means 30. Boric acid 40 optionally flows from hopper 50 into milling means 60 and borate sulfate 70 optionally flows from hopper 80 into milling means 90. The resin 10 which has been milled in milling means 30, along optionally, with boric acid 40 which has been milled by milling means 60 and barium sulfate 70 which has been milled by milling means 90 are transported by conveying means 100 to fan 110. A blend of resin 10, and, optionally, boric acid 40 and barium sulfate 70 is airveyed (i.e., pneumatically conveyed) by fan 110 to form air stream feed 115 to comminuting means 125. Cellulose material 120 is simultaneously fed to comminuting 125. The output 130 of comminuting means 125 is airveyed by fan 140 to comminuting means 145. The output 150 of mill 145 is then airveyed by fan 155 to packaging machine 160 wherein the resin coated, and optionally flame retardant coated, particles are packaged.

Sufficient quantities of resin are entrained in the airstream fed into the comminuting means 125 to sufficiently coat the cellulose particles. The feed rate will vary in accordance with the feed rate of cellulose material to the comminuting means. Typically, for each kilogram of cellulose material about 8 to about 15 kilograms of resin will be used, more typically about 10 to about 14 kilograms, and, preferably about 11 to about 13 kilograms.

The feed rate of cellulose material to the comminuting means will vary in accordance with the type of comminuting means used, the type of cellulose material, etc. Various types of comminuting means typically known in the art may be used in the practice of the present invention such as hammer mills, paper shredders, Cumberland cutters, etc., and equivalents thereof. Typically the feed rate of cellulose material will be about 20 to about 55 kilograms/min., more typically about 30 to about 50 kilograms/min., and, preferably, about 45 kilograms/min.

When fire retardants are optionally used, sufficient quantities of the fire retardants will be fed to the comminuting means with the resin in the airstream so that the cellulose is made sufficiently fire retardant by sufficiently coating the cellulose particles. Typically, for each 100 kilograms of cellulose, about 1 to about 7 kilograms of boric acid are fed, more typically about 2 to about 5 kilograms, and preferably about 3 to about 5 kilograms. Typically, for each 100 kilograms of cellulose, about 1 to about 7 kilograms of barium sulfate are fed, more typically about 2 to about 5 kilograms, and preferably about 3 to about 5 kilograms.

It is critical in the practice of the present invention to feed the resin, and, optionally, flame retardants, entrained in an airstream to the comminuting means. Therefore, sufficient particle sizes and sufficient airstream velocities are required to properly entrain the resin and optional flame retardants in the airstream.

It is also critical in the practice of this invention to retain the cellulose and resin, and optionally the flame retardants, in the comminuting means for a sufficient period of time to coat the cellulose particles thereby produced. The residence time is typically about 5 seconds to about 15 seconds, more typically about 5 seconds to about 10 seconds, and preferably about 7 seconds. The residence time is controlled by controlling the speed of the comminuting means, for example, when a hammer mill is used the mill speed or speed of the milling elements is controlled.

Although it is preferred to use at least two comminuting means in series to produce the resin-coated particles of the present invention, a single comminuting means may also be used to produce the resin-coated particles of the present invention.

Although the reasons for the bonding of the resin to the cellulose particles, or optionally the flame retardants, are not clearly understood, it is believed to be the result of the extremely high shear and compressive stresses which the resin and cellulose, and optionally flame retardants, are subjected to during the comminuting process, thereby bonding the dry resin to the surface of the cellulose particles. It is also believed to be due to waxes incorporated in resins.

The resin-coated cellulose particles of this invention will typically contain about 5 wt. % to about 15 wt. % of resin, more typically about 5 wt. % to about 10 wt. %, and preferably about 8 wt. %. The resin-coated cellulose particles will optionally contain about 5 wt. % to about 12 wt. % of at least one flame retardant, more typically about 5 wt. % to about 10 wt. %, and preferably about 7 wt. %.

The resin-coated particles of this invention will, when airveyed and formed into an air-laid web, typically retain at least about 95 wt. % to about 97 wt. % of the resin coating. The optional flame retardants will have a similar retention rate.

The nonwoven fiber webs of the present invention are made using the novel resin coated-cellulose particles of the present invention in a conventional air-laying process known in the art and conventional air-laying equipment known in the art such as that manufactured by Rando Machine Corporation, The Commons, Macedon, N.Y. The term "web" is defined to mean a web, mat or nonwoven fabric produced by an air-laying method. Typically, the webs of the present invention are formed by feeding resin-coated cellulose particles and synthetic fibers to a mixer wherein the synthetic fiber and resin-coated cellulose particles are thoroughly admixed to form a uniform stream. Then, the synthetic fiber and resin coated-cellulose particle stream is airveyed to a web forming machine comprising a moving, perforated endless belt, or screen, etc., wherein a vacuum is pulled from the underside of the belt. The synthetic fibers and resin-coated cellulose particles are deposited on the belt thereby forming an interconnecting lattice which is referred to as a web, a mat or a fabric. The web is continuously removed from the web forming machine and rolled-up for use in the molding operation.

The turbulent air stream which is used to pneumatically convey conventional resin and fiber mixtures tends to separate the resin from the fibers. The air-laying of the web has a similar effect. It can be appreciated that bonding of the resin to the cellulose fibers as in the present invention is necessary to produce a uniform resin distribution.

A moldable web of the present invention typically comprises about 65 wt. % to about 95 wt. % of resin-coated cellulose particles, more typically about 75 wt. % to about 90 wt. %, and preferably about 77 wt %. The webs will typically contain about 5 wt. % to about 35 wt. % of synthetic fibers, more typically about 7 wt. % to about 30 wt. %, and preferably about 23 wt. %.

The nonwoven fiber webs manufactured from the resin-containing particles of this invention are cut to the desired shaped pieces prior to molding. The pieces are then molded in conventional molding machines at sufficient heat and pressure to produce molded articles having superior mechanical properties.

Typically the resin-containing mats are molded at a temperature of about 200° C. to about 250° C., preferably about 200° C. to about 230° C. The molding pressure is typically about 180 psig. to about 250 psig., preferably about 190 psig. to about 220 psig. The molding time is typically about 30 seconds to about 120 seconds, preferably about 40 seconds to about 110 seconds. The density of the molded articles of the present invention will typically be about 12 lbs/ft$^3$ to about 65 lbs/ft$^3$, more typically about 15 lbs/ft$^3$ to about 60 lbs/ft$^3$, and preferably about 30 lbs/ft$^3$. Examples of the molded articles manufactured by the method of this invention include trim panels for use in automobiles and other vehicles, trim panels for use in aircraft, mobile homes, shipping containers, etc.

The following examples are illustrative of the principles and practice of this invention, although not limited thereto. Parts and percentages where used are parts and percentages by weight.

EXAMPLE 1

Phenolic resin (Durez TM 31840, manufactured by Durez Resin and Molding Co.), barium sulfate and boric acid were individually fed into respective hoppers. Each hopper contained a volumetric feeder. The feed rates of each volumetric feeder were adjusted by adjusting a DC variable speed on each volumetric feeder to produce the desired quantities in the finished product. The resin, boric acid and barium sulfate were individually processed in a Schuty Oniel mill, then blended in a screw conveyor and pneumatically conveyed in an airstream to a first hammer mill (Model No. 7136, manufactured by Cumberland Co., R.I.) set up at about 0.125". Recycled newsprint was simultaneously fed with the resin, boric acid and barium sulfate airstream to the first hammer mill. The feed rate of the resin/flame retardant airstream was about 15 kilograms/min. The amount of resin in the mixture was about 50 wt. %. The feed rate of the newsprint was about 75 kg/min. The cellulose was milled in the first hammermill to less than about 200 mesh with about a 5 to 10 second residence time. The output of the first hammermill was then pneumatically conveyed to a second identical hammer mill and milled to less than about 200 mesh with about a 5 to 10 second residence time thereby producing resin and flame retardant coated cellulose particles. The coated cellulose particles were then pneumatically conveyed to packaging unit and bagged. Essentially all of the resin and flame retardants fed into the process were deposited on the cellulose particles. There was no measurable loss of resin or flame retardants during the process. The resin-coated cellulose particles had an average size of about 0.25 mm to about 0.5 mm.

EXAMPLE 2

The resin-coated cellulose particles of Example 1 were formed into an air-laid web in a conventional air-laying apparatus by admixing or blending the resin-coated cellulose particles of Example 1 with #6 Denier polyester fibers having an average length of about 1.0". The mixture was then airveyed to a webber in which webs were formed having thicknesses of about ½"–¾", and widths of about 40"–60". The webs were rolled-up for use in molding operations. The webs contained about 7–12 wt. % polyester fiber.

The air-laying equipment was manufactured by Rando Machine Corp., located in Macedon, N.Y.

There was no measurable loss of resin or flame retardants during the air-laying process.

EXAMPLE 3

The air-laid webs of Example 2 were cut and molded into an article on a Carver press Model No. 2518 manufactured by Fred S. Carver, Inc., located in Menomonee, Wic. The article had the following dimensions: about 12" long by about 10" wide by about 0.25" thick. The fiber web was molded at about 200° C. and about 180 psig. for about 50 seconds. The article had a density of about 30 lbs/ft$^3$. The article exhibited high flexural strength, tensile strength, dimensional stability and uniform resin distribution. The article was also resistant to burning. the article was tested for flammability in accordance with ASTM Specification No. E-286-69.

The process of the present invention produces molded articles from cellulose particles having dry resin deposited uniformly thereon. Since it is a dry process and the resin is deposited on the particles in dry, powdered form, the disadvantages of a wet system are eliminated such as removal of solvent, agglomeration of cellulose particles, non-uniform resin distribution, etc.

The process of the present invention has advantages over previous methods of incorporating dry resin into a cellulose particle mixture. The methods of the prior art merely blend the milled cellulose particles with dry resin resulting in a mixture of cellulose particles and resin particles. Due to the nature of the air-laying process used in forming a fiber web, considerable amounts of the powdered resin are lost in processing. The dry process of the present invention produces cellulose particles which surprisingly and unexpectedly have deposited thereon an adherent coating of dry resin. It is further surprising and unexpected that the resin adheres to the particles during pneumatic conveying and during a typical air-laying process although the reason for this adherence is not clearly understood. The use of the resin-coated cellulose particles of the present invention to produce an air-laid fiber web results in molded articles having a uniform distribution of resin. These molded articles have improved mechanical properties such as tensile strength, compressive strength, and bending strength. In addition, the inclusion of flame retardants on the cellulose particles produces burn-resistant molded articles.

Although this invention has been shown and described with respect to detailed embodiments thereof, it will be understood by those skilled in the art that various changes in form and detail thereof may be made without departing from the spirit and scope of the claimed invention.

We claim:

1. A method of molding objects from a resin containing cellulose particle fiber web, the fiber web is formed by an air-laying process wherein cellulose particles and resin are pneumatically conveyed and deposited on a surface to form a web, the improvement comprises, producing dry resin-coated cellulose particles by simultaneously feeding cellulose material and a dry resin-containing airstream, wherein the resin particle size is about 1 micron to about 5 microns, into at least one comminuting means and retaining the cellulose and resin in the comminuting means for a sufficient period of time so that the resin is uniformly deposited over the surface of the cellulose particles such that substantially all of the resin adheres to the particles during pneumatic conveying and air-laying to form a web, the web is molded at sufficient temperature and pressure thereby producing a molded article having a uniform distribution of resin such that the molded article has high strength and structural integrity.

2. The method of claim 1 wherein the comminuting means is a hammer mill.

3. The method of claim 1 wherein the cellulose material comprises newsprint.

4. The method of claim 1 wherein the resin comprises a thermosetting phenolic resin.

5. The method of claim 1 wherein the cellulose particles are fibers.

6. The method of claim 1 wherein the cellulose particles have an average length of about one-eighth inch.

7. The method of claim 1 wherein the cellulose particles retain at least about 98% of the resin when air-laid into a fiber web.

8. The method of claim 1 wherein at least one flame retardant material is entrained in the resin containing airstream and simultaneously fed into the comminuting means with the resin, thereby producing a flame resistant molded article.

9. The method of claim 1 wherein the web additionally comprises synthetic fiber, said fiber admixed with the resin-coated cellulose fiber to form a stream which is air-laid to form said web.

10. The method of claim 9 wherein the synthetic fiber is selected from the group consisting of glass fiber polyester, polypropylene, and a combination thereof.

* * * * *